United States Patent [19]

Yazawa et al.

[11] Patent Number: 4,960,843

[45] Date of Patent: Oct. 2, 1990

[54] METHOD OF PRODUCING POLY(VINYL CHLORIDE)-BASED RESINS

[75] Inventors: Masahiko Yazawa; Hiroshi Kaneko, both of Yokkaichi; Katsuo Takemoto, Aichi, all of Japan

[73] Assignee: Tosoh Corporation, Shin-nanyo, Japan

[21] Appl. No.: 374,909

[22] Filed: Jul. 3, 1989

[30] Foreign Application Priority Data

Jul. 5, 1988 [JP] Japan ............................. 63-165878

[51] Int. Cl.$^5$ ............................................ C08F 22/40
[52] U.S. Cl. ................................................. 526/262
[58] Field of Search ......................................... 526/262

[56] References Cited

U.S. PATENT DOCUMENTS 3,352,832 11/1967 Barr et al. ........................... 526/262
3,666,720 5/1972 Nield et al. ......................... 526/262

FOREIGN PATENT DOCUMENTS 41-9551   5/1966  Japan .
44-12433  6/1969  Japan .
61-221209 3/1985  Japan .
61-221209 10/1986 Japan .

Primary Examiner—Joseph L. Schofer
Assistant Examiner—Alex H. Walker
Attorney, Agent, or Firm—Armstrong, Nikaido, Marmelstein, Kubovcik & Murray

[57] ABSTRACT

A method of producing poly(vinyl chloride)-based resins is disclosed, which is characterized in that, in the method of producing poly(vinyl chloride)-based resins through the radical copolymerization of vinyl chloride with N-substituted maleimides represented by a general formula (1), the N-substituted maleimides are emulsified with a medium comprising a liquid organic compound having at least one hydroxyl group, and water:

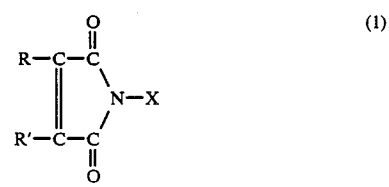

wherein X is a substituted or unsubstituted straight chain or cyclic, aliphatic or aromatic group having 1 to 30 carbon atoms, and R and R', which may be identical or different, are hydrogen atoms, fluorine, chlorine or bromine atoms, cyano groups or alkyl groups having not more than 3 carbon atoms.

5 Claims, No Drawings

METHOD OF PRODUCING POLY(VINYL CHLORIDE)-BASED RESINS

BACKGROUND OF THE INVENTION

The present invention relates to a method of producing vinyl chloride-based resins having excellent deformation resistance under heat and processibility into plate, sheet, film, profile articles, pipe, blow molded articles, etc.

Up to this day, improvement in the deformation resistance of poly(vinyl chloride) under heat, has been attempted by post-chlorination of poly(vinyl chloride), or this post-chlorinated poly(vinyl chloride) (hereinafter abbreviated as chlorinated PVC) has been blended with additional poly(vinyl chloride) in any proportions.

Japanese Patent Publications No. Sho 41-9551 or No. Sho 44-12433, show a method of copolymerizing vinyl chloride with N-substituted maleimides.

When using chlorinated PVC for improving the deformation resistance of poly(vinyl chloride) under heat, there are drawbacks such as:

① narrow processible latitude when actually processing,

② poor thermal stability for processing resulting in remarkable coloration,

③ large thermal shrinkage at high temperature, and the like.

On the other hand, in the case of copolymers of vinyl chloride with N-substituted maleimides described in Japanese Patent Publication No. Sho 41-9551 or No. Sho 44-12433, such drawbacks as can be seen in chlorinated PVC are improved to some extent. However, new problems have been caused such that the thermal meltability of the PVC is worsened because the N-substituted maleimide, being a rigidity component introduced for raising the deformation resistance under heat, causes a decrease in producibility, coloration is generated in the copolymer during melting due to exposure to high temperature for many hours, and the like.

In order to improve such drawbacks, the type of N-substituted maleimides is restricted in the method described in Japanese Patent Publication No. Sho 44-12433. Furthermore, in order to avoid the peculiar coloration of molded articles made from such copolymers, the polymerization is said to be desirably conducted at a temperature of −10° to 40° C.

This method is however not practical because the particularly restricted N-substituted maleimides have very poor polymerizability further, there are problems in facilities when producing this copolymer industrially.

Moreover, in a method described in Japanese Unexamined Patent Publication No. Sho 61-221209, it is stated that said problems can be improved by allowing a chain transfer agent to coexist and by conducting the polymerization at a temperature lower than 40° C. In this case, too, however, there arise problems such that the polymerizability is poor, and the type of chain transfer agents is restricted to avoid destructive chain transfer, thereby sufficiently improved processibility, and the like, cannot be attained.

The purpose of this invention is to provide a method which is simpler than conventional methods and corresponds closely enough to existing practical producing facilities such that vinyl chloride-based resins having excellent processibility and deformation resistance under heat can be produced without decreasing polymerizability.

SUMMARY OF THE INVENTION

The invention provides a method of producing vinyl chloride-based resins, excellent in processibility and deformation resistance under heat, by copolymerizing vinyl chloride with N-substituted maleimides emulsified with a medium comprising at least one liquid organic compound having at least one hydroxyl group in molecule, and water, thereby enhancing the uniform dispersibility of N-substituted maleimide in the copolymer. This solves the aforesaid problems in said vinyl chloride-N-substituted maleimide copolymers.

DETAILED DESCRIPTION OF THE INVENTION

In following, the important matters for the constitution of the invention will be illustrated in more detail.

N-substituted maleimides to be used in the invention are represented by a general formula (1)

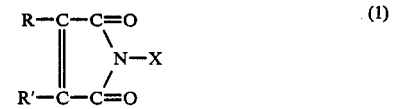

wherein X is a substituted or non-substituted, chain or cyclic, aliphatic or aromatic group having 1 to 30 carbon atoms, and R and R′, which may be identical or different, are hydrogen atoms, fluorine, chlorine or bromine atoms, cyano groups or alkyl groups having not more than 3 carbon atoms.

As specific examples, N-phenylmaleimide, N-(o,m,p)-methylphenylmaleimide, N-(o,m,p)-methoxymethylphenylmaleimide, N-(o,m,p)-chlorophenylmaleimide, N-methylmaleimide, N-n-propylmaleimide, N-isopropylmaleimide, N-n-butylmaleimide, N-sec-butylmaleimide, N-tert-butylmaleimide, N-octylmaleimide, N-cyclohexylmaleimide, N-4-methyl-cyclohexylmaleimide, N-2-methyl-cyclohexylmaleimide, N-triphenylmethylmaleimide, etc. can be mentioned.

The monomer composition ratio of N-substituted maleimide to vinyl chloride is not restricted, but the content of N-substituted maleimide to total weight of copolymer is preferably 1 to 50% in order to impart heat resistance to the copolymer, and content of 5 to 45% is particularly preferable for satisfying both heat resistance and processibility.

The liquid organic compounds having at least one hydroxyl group in their molecules to be used for the emulsification of N-substituted maleimide are, for example, chain or cyclic, monovalent or polyvalent, aliphatic lower alcohols having not more than 5 carbon atoms and being highly soluble into water, and specifically methyl alcohol and ethyl alcohol can be mentioned.

The amount of liquid organic compound having hydroxyl group its in molecule to be used for the emulsification is preferably 10 to 300 parts by weight, in particular, 70 to 200 parts by weight, per 100 parts by weight of N-substituted maleimide for raising the stability of the emulsion and the uniform dispersibility of the N-substituted maleimide in the polymerization vessel.

The amount of water to be used for the emulsification is preferably not more than 300 parts by weight per 100 parts by weight of N-substituted maleimide for raising the stability of the emulsion.

The dispersing and stabilizing agents to be used for the emulsification of N-substituted maleimide may be any of those ordinarily used in general suspension polymerization methods or emulsion polymerization methods. For example, poly(vinyl alcohol), gelatin, alkylcellulose, other nonionic or anionic surfactant, or the like can be mentioned.

The amount of dispersing and stabilizing agent to be used for the emulsification is preferably not more than 5 parts by weight per 100 parts by weight of N-substituted maleimide for raising the stability of the emulsion.

For putting the invention into practice, the generally used suspension polymerization method or emulsion polymerization method used generally can be applied as it is, but, considering industrial production facilities, the suspension polymerization is most suitable. In this case, as a method for adding the emulsion of N-substituted maleimide, it is preferable to have it present in the polymerization system from the time immediately after the start of polymerization. At this time, a regulated amount of emulsion may be charged in a lump immediately after the start of polymerization or it may be charged into the polymerization vessel, in lots, from the time immediately after the start of polymerization.

For the polymerization initiators and the dispersing and stabilizing agents to be used for the polymerization, anyone can be used, provided that they are used ordinarily for the general suspension polymerization method or emulsion polymerization method.

The N-substituted maleimides emulsified with a medium comprising a liquid organic compound having a hydroxyl group in its molecule, and water according to the invention, can enhance the uniform dispersion of N-substituted maleimides in the polymerization system. As a result, it is possible to obtain vinyl chloride-based resins having excellent deformation resistance under heat and processibility compared with conventional ones.

As evident from the illustration above, by using the N-substituted maleimides emulsified with a medium comprising a liquid organic compound having a hydroxyl group in its molecule, and water, according to the invention, for the copolymerization with vinyl chloride, the uniform dispersibility of N-substituted maleimides is enhanced in the polymerization system, and the copolymers obtained have features such that:

(1) the deformation resistance of molded articles under heat is higher than that of copolymers obtained through the usual polymerization,
(2) the gelling time on molding is shorter than that of other general purpose PVCs or that of copolymers obtained through the usual polymerization,
(3) because of fast gelling velocity, it is possible to reduce the heat history during processing resulting in the substantial improvement in the coloration due to the deterioration of resin, and the like. They are therefore suitable for the products such as plate, sheet, film, profile articles, pipe, blow-molded articles, etc. providing high industrial value to the invention. The specific examples illustrate the invention but the invention is not confined to these.

EXAMPLE 1

Preparation of Emulsion of N-substituted Maleimide 1

Into a beaker with an inner volume of 1 liter, 100 parts by weight of pulverized N-cyclohexylmaleimide (hereinafter abbreviated as N-CHMI), 150 parts by weight of methyl alcohol, 80 parts by weight of pure water and 1.0 part by weight of partially saponified poly(vinyl alcohol), the saponification degree thereof being 78 mol % and the viscosity of a 4% aqueous solution thereof being 11 cps at 20° C., were charged. When stirring at room temperature by the use of a homogenizer, this became a milky-white homogenous emulsion.

Production of Poly(Vinyl Chloride)-Based Resin

After charging 200 parts by weight of pure water, 0.25 parts by weight of partially saponified poly(vinyl alcohol), the saponification degree thereof being 78 mol % and the viscosity of a 4% aqueous solution thereof being 11 cps at 20° C., and 0.5 parts by weight of 2,2'-azobis-2,4-dimethylvaleronitrile into a polymerization vessel with an inner volume of 5 liters, 100 parts by weight of vinyl chloride monomer were injected in a state of reduced pressure.

Then, this was warmed to 55° C. under stirring and, after coming to constant temperature, 20 parts by weight of the emulsion previously prepared were injected into the polymerization vessel with nitrogen gas to continue the polymerization reaction.

At a point of time when the pressure inside the polymerization vessel dropped by 1.8 kg/cm$^2$ from the pressure in the steady state of polymerization reaction, the unreacted vinyl chloride monomer was collected. Thereafter, the slurry was taken out from the polymerization vessel, dewatered and dried to obtain a white powdery polymer at a conversion rate of polymerization of about 85%.

EXAMPLE 2

Except that 40 parts by weight of emulsion prepared in Example 1 were introduced into the polymerization vessel with nitrogen gas, the polymerization reaction was conducted similarly to Example 1.

At a point of time when the pressure inside the polymerization vessel dropped by 1.8 kg/cm$^2$ from the steady state pressure after 9 hours from the start of polymerization, unreacted vinyl chloride monomer was collected.

After the collection of monomer, the slurry was taken out of the polymerization vessel, dewatered and dried to obtain a white powdery polymer at a conversion rate of polymerization of about 85%.

EXAMPLE 3

Except that 10 parts by weight of emulsion prepared in Example 1 were introduced into the polymerization vessel with nitrogen gas immediately after the start of polymerization and immediately before the commencement of pressure drop inside the polymerization vessel at 3 hours later from the start of polymerization another 10 parts thereof were introduced, the polymerization reaction was conducted similarly to Example 1.

At a point of time when the pressure inside the polymerization vessel dropped by 1.8 kg/cm$^2$ from the steady state pressure after 9 hours from the start of polymerization, unreacted vinyl chloride monomer was collected. Then, the slurry was taken out of the polymerization vessel, dewatered and dried to obtain a white powdery polymer at a conversion rate of polymerization of about 85%.

COMPARATIVE EXAMPLE 1

Preparation of Emulsion of N-Substituted Maleimide 2

Into a beaker with an inner volume of 1 liter, 100 parts by weight of pulverized N-CHMI, 1.7 parts by weight of partially saponified poly(vinyl alcohol), the saponification degree thereof being 78 mol % and the viscosity of a 4% aqueous solution thereof being 11 cps at 20° C., and 230 parts by weight of pure water were charged. When stirring at room temperature by the use of a homogenizer, this became a milky-white homogeneous emulsion.

Production of Poly(Vinyl Chloride)-Based Resin

Except that 20 parts by weight of emulsion previously prepared were introduced into the polymerization vessel with nitrogen gas, the polymerization reaction was conducted similarly to Example 1.

At a point of time when the pressure inside the polymerization vessel dropped by 1.8 kg/cm$^2$ from the steady state pressure after 9 hours from the start of polymerization, unreacted vinyl chloride monomer was collected. Then, the slurry was taken out of the polymerization vessel, dewatered and dried to obtain a white powdery polymer at a conversion rate of polymerization of about 85%.

COMPARATIVE EXAMPLE 2

Except that 40 parts by weight of emulsion prepared in Comparative example 1 were introduced into the polymerization vessel with nitrogen gas immediately after the start of polymerization, the polymerization reaction was conducted similarly to Example 1.

At a point of time when the pressure inside the polymerization vessel dropped by 1.8 kg/cm$^2$ from the steady state pressure after 9 hours from the start of polymerization, unreacted vinyl chloride monomer was collected. Then, the slurry was taken out of the polymerization vessel, dewatered and dried to obtain a white powdery polymer at a conversion rate of polymerization of about 85%.

COMPARATIVE EXAMPLE 3

After charging 200 parts by weight of pure water, 0.25 parts by weight of partially saponified poly(vinyl alcohol), the saponification degree thereof being 78 mol % and the viscosity of a 4% aqueous solution thereof being 11 cps at 20° C., 0.5 parts by weight of 2,2'-azobis-2,4-dimethylvaleronitrile and 6.1 parts by weight of N-CHMI into a polymerization vessel with an inner volume of 5 liters, 100 parts by weight of vinyl chloride monomer were charged in a state of reduced pressure. Then, this was warmed to 55° C. under stirring and, at a point of time when the pressure inside the polymerization vessel dropped by 1.8 kg/cm$^2$ from the pressure in the steady state of the polymerization reaction, the unreacted vinyl chloride monomer was collected. The polymerization time was 9 hours.

After the collection of unreacted monomer, the slurry was taken out from the polymerization vessel, dewatered and dried to obtain a white powdery polymer at a conversion rate of polymerization of about 85%.

COMPARATIVE EXAMPLE 4

After charging 200 parts by weight of pure water, 0.25 parts by weight of partially saponified poly(vinyl alcohol), the saponification degree thereof being 78 mol % and the viscosity of a 4% aqueous solution thereof being 11 cps at 20° C., and 0.5 parts by weight of 2,2'-azobis-2,4-dimethylvaleronitrile into a polymerization vessel with an inner volume of 5 liters, 100 parts by weight of vinyl chloride monomer were charged in a state of reduced pressure. Then, this was warmed to 55° C. under stirring and, at a point of time when the pressure inside the polymerization vessel dropped by 1.8 kg/cm$^2$ from the pressure in the steady state of the polymerization reaction, the unreacted vinyl chloride monomer was collected. The polymerization time was 9 hours.

After the collection of unreacted monomer, the slurry was taken out of the polymerization vessel, dewatered and dried to obtain a white powdery polymer at a conversion rate of polymerization of about 85%.

With 100 parts by weight of vinyl chloride-based copolymers and poly(vinyl chloride) obtained in Example 1 through 3 and Comparative example 1 through 4, 3.0 parts by weight of dibutyl tin maleate type stabilizer (N-2000E: made by Nitto Kasei Co.), 1.5 parts by weight of dibutyl tin laurate type stabilizer (E-101: made by Tokyo Fine Chemical Co.), 0.5 parts by weight of phosphite type chelator (MARK 1500: made by Adeka Argus Co.), 0.5 parts by weight of butyl stearate (made by Kawaken Fine Chemical Co.) and 0.5 parts by weight of stearyl alcohol type lubricant (kalcol 86: made by Kao Sekken Co.) were formulated, respectively, to evaluate following physical properties.

(1) Gelling time

The gelling time of formulated compositions was measured by the use of a Rheocode System 40 made by Haake Co. The measurement conditions were set at a temperature of 170° C. and a number of revolutions of 60 rpm.

(2) Temperature of deformation resistance under heat

The formulated compositions were kneaded for 5 minutes with two rolls, the surface temperature thereof being 170° C., after the compositions had been wound round the rolls. The rolled sheets thus obtained were further press-molded for 10 minutes at 185° C. to make the samples for evaluation.

For the evaluation, a device for the measurement of Vicat softening temperature described in JIS K-6740 was used and a temperature at which the penetration of needle occurred into the sample was determined.

(3) Thermal stability of rolled sheets

The formulated compositions were kneaded with two rolls, the surface temperature thereof being 170° C. and the kneading was continued as it was after the compositions had been wound round the rolls. The coloration of sheets after 5 minutes and 10 minutes was evaluated visually.

O No coloration; Δ Some amount of coloration; X coloration

TABLE

| | | Example | | | Comparative example | | | |
|---|---|---|---|---|---|---|---|---|
| | Run No. | 1 | 2 | 3 | 1 | 2 | 3 | 4 |
| Polymerization conditions | Vinyl chloride (part by wt.) | 100 | 100 | 100 | 100 | 100 | 100 | 100 |
| | N-CHMI emulsion | 20 | 40 | 10 | 20 | 40 | Note | 0 |

| | Example | Example | | | Comparative example | | | |
|---|---|---|---|---|---|---|---|---|
| Run No. | | 1 | 2 | 3 | 1 | 2 | 3 | 4 |
| | Pre-charging (part by wt.) N-CHMI emulsion | 0 | 0 | 10 | 0 | 0 | 6.1 0 | 0 |
| | Post-charging (part by wt.) Polymerization temperature (°C.) | 55 | 55 | 55 | 55 | 55 | 55 | 55 |
| | Polymerization yield (%) | 85 | 85 | 85 | 85 | 85 | 85 | 85 |
| Evaluation results | Gelling time (sec.) | 18 | 21 | 13 | 76 | 120 | 97 | 65 |
| | Temperature of deformation resistance under heat (°C.) | 73 | 78 | 71 | 70 | 75 | 68 | 62 |
| | thermal 170° C. × 5 min. | O | O | O | Δ | X | X | O |
| | Stability 170°C. × 10 min. | O | Δ | O | X | X | X | O |

Note
Powdery N-CHMI not emulsified

What is claimed is:
1. In the process of copolymerizing vinyl chloride with N-substituted maleimide of the formula:

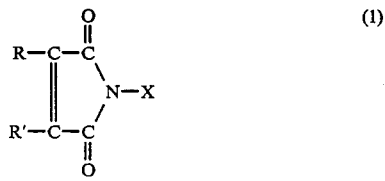

wherein
X is a substituted or unsubstituted straight chain or cyclic, aliphatic or aromatic group having 1 to 30 carbon atoms, and R and R', which may be identical or different, are hydrogen atoms, fluorine, chlorine or bromine atoms, cyano groups or alkyl groups having not more than 3 carbon atoms; by emulsion polymerization in an aqueous medium in contact with a polymerization catalyst; the improvement which comprises incorporating in said aqueous medium a liquid organic compound having a hydroxyl group in its molecule in an amount sufficient to maintain said emulsion, and recovering said copolymer having improved heat deformation resistance, shorter gelling time on molding, and improved coloration resistance.

2. The improved process as claimed in claim 1, wherein said N-substituted maleimide comprises about 1 to 50% by weight of said copolymer.

3. The improved process as claimed in claim 1, wherein said liquid organic compound is present in a proportion of about 10 to 300 parts by weight per 100 parts by weight of said N-substituted maleimide.

4. The improved process as claimed in claim 1, wherein said liquid organic compound is a lower alcohol.

5. The improved process as claimed in claim 1, wherein said water is present in a proportion of up to about 300 parts by weight per 100 parts by weight of N-substituted maleimide.

* * * * *